United States Patent
Huber et al.

(10) Patent No.: US 7,526,586 B2
(45) Date of Patent: Apr. 28, 2009

(54) REMOVABLE PERSONAL DIGITAL ASSISTANT IN A DUAL PERSONAL COMPUTER/PERSONAL DIGITAL ASSISTANT COMPUTER ARCHITECTURE

(75) Inventors: Gary Douglas Huber, Austin, TX (US); Howard A. Shoobe, Austin, TX (US); La Vaughn F. Watts, Jr., Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 10 days.

(21) Appl. No.: 11/691,060

(22) Filed: Mar. 26, 2007

(65) Prior Publication Data

US 2007/0213105 A1    Sep. 13, 2007

Related U.S. Application Data

(63) Continuation of application No. 09/770,148, filed on Jan. 26, 2001, now Pat. No. 7,197,584.

(51) Int. Cl.
*G06F 13/12* (2006.01)
(52) U.S. Cl. .................. 710/72; 710/62; 710/303
(58) Field of Classification Search .................. 710/72, 710/62, 303
See application file for complete search history.

(56) References Cited

U.S. PATENT DOCUMENTS

| | | | |
|---|---|---|---|
| 5,052,943 A | 10/1991 | Davis | |
| 5,590,338 A | 12/1996 | Parks et al. | |
| 5,600,800 A | * 2/1997 | Kikinis et al. | 710/303 |
| 5,608,884 A | 3/1997 | Potter | |
| 5,613,135 A | 3/1997 | Sakai et al. | |
| 5,648,762 A | 7/1997 | Ichimura et al. | |
| 5,680,126 A | 10/1997 | Kikinis | |
| 5,742,794 A | 4/1998 | Potter | |
| 5,768,163 A | 6/1998 | Smith | |
| 5,793,957 A | 8/1998 | Kikinis et al. | |
| 5,809,262 A | 9/1998 | Potter | |
| 6,000,000 A | 12/1999 | Hawkins et al. | |
| 6,038,670 A | 3/2000 | Oh | |
| 6,043,626 A | 3/2000 | Snyder et al. | |
| 6,493,782 B1 | 12/2002 | Verdun et al. | |

(Continued)

OTHER PUBLICATIONS

Jeff Pittelkau, "Review: A Portable Keyboard and HotSync Cradle In One", Oct. 30, 2000, CNN.com-http://archives.cnn.com/2000/TECH/computing/10/30/palm.keyboard.idg/index.html.

*Primary Examiner*—Alford W Kindred
*Assistant Examiner*—David E Martinez
(74) *Attorney, Agent, or Firm*—Haynes and Boone, LLP

(57) ABSTRACT

An integrated computer system includes a computer system, having at least a display, a chassis, a memory, a power supply and a communication interface, and a personal digital communications (PDC) system, having at least a display, a memory, a battery and a communication interface. The computer chassis is configured to removably retain the PDC system in a docked mode, and when in said docked mode the PDC system is operable to communicate with the computer system through the respective communication interfaces and the computer system is operable to send data from the computer memory to the PDC system. The PDC system is operable to receive said data and store said data in the PDC memory and to display at least a subset of said data on the PDC display when the computer system is powered on or off.

16 Claims, 6 Drawing Sheets

U.S. PATENT DOCUMENTS

| | | |
|---|---|---|
| 6,523,079 B2 | 2/2003 | Kikinis et al. |
| 6,523,124 B1 | 2/2003 | Lunsford et al. |
| 6,609,207 B1 | 8/2003 | Cromer et al. |
| 6,728,812 B1 | 4/2004 | Kato |
| 6,781,635 B1 | 8/2004 | Takeda |
| 2002/0103951 A1 | 8/2002 | Huber et al. |
| 2003/0188077 A1 | 10/2003 | Watts et al. |

* cited by examiner

REMOVABLE PERSONAL DIGITAL ASSISTANT IN A DUAL PERSONAL COMPUTER/PERSONAL DIGITAL ASSISTANT COMPUTER ARCHITECTURE

CROSS REFERENCE TO RELATED PATENT APPLICATIONS

The present application is a Continuation of U.S. application Ser. No. 09/770,148, filed on Jan. 26, 2001, the disclosure of which is incorporated herein by reference.

BACKGROUND

The disclosure relates generally to a computing system and more particularly to a mobile computing system integrating a removable personal digital communications (PDC) system also referred to as a personal digital assistant (PDA) system with a personal computer (PC) system.

There are currently two popular types of mobile computing systems. The mobile Personal Computer (PC) system is a fully functional data processing system, typically having the same functionality as a desktop PC or a workstation PC. The mobile PC system (PC system) can run under any number of standard operating systems (OS), such as one of the releases of Windows® by the Microsoft Corporation. In implementing the PC system in a mobile computing architecture, several relatively undesirable features are apparent. First, the batteries of the PC system must be recharged after a relatively short time, typically in the order of a few hours. Despite improvements in battery technology, the quest for lighter and more compact portable PC units have tended to reduce the space allocated to the batteries so that time between charging of the batteries has not been significantly improved. The batteries used in the PC system, however, are capable of relatively rapid charging. As with the desktop PC unit and the workstation PC from which they are derived, the OS needed for the PC system requires a relatively long time from the activation of power to the time when the processing system is available for actual computation. The PC system, however, has remarkable flexibility and can provide processing capability of extraordinary power. PC systems also have great memory capacity, having disk drives that can store significant amounts of information.

Now referring to FIG. 1, illustrated is a common PC unit. A PC chassis 100 can be about 16 inches across. The size of a typically PC chassis 100 makes it portable, but it is still not small enough to put in coat pocket. Part of the PC 100 is a display 105. The display 105 is a relatively large output screen that can typically measure 15 inches diagonally. A keyboard 125 is provided for input, as well as a touch pad 130. Many PC units today provide for expansion or media bays; the particular example illustrates two such bays, expansion bay 110 and expansion bay 115. A form factor device 120 can be inserted into the either bay 110 or bay 115. The form factor device can be a hard disk drive, a CD drive, a battery, or some other device that expands the capability of the PC system. Form factor device 120 is packaged in a standard size to fit in either bay 110 or bay 115, and connects to a standard connection interface to the PC system. The interface typically consists of a communication interface and a power interface to the system.

More recently the personal digital assistant (PDA) system has been developed to take advantage of OS such as Palm® OS and Windows® CE. These operating systems, in conjunction with a PDA system, permit a reduced or specialized functionality computing system.

PDA systems are relatively small in physical size and can perform a variety of useful functions such as arrange calendars; schedule appointments; send and receive e-mail; provide presentations; create documents; and provide communications. The PDA OS can permit exchange of files between the PDA systems and a PC system with Microsoft Windows® files. While the reduced functionality can be a disadvantage of the PDA system, the PDA system has several advantages. An advantage is the time between charging of the batteries can be greatly extended, a result of the reduced functionality and the absence of disk storage units.

Now referring to FIG. 2, illustrated is a common PDA unit. The PDA unit 200 is a relatively small unit compared to a PC unit. The physical size can be less than five inches in length, easily fitting into a shirt pocket. The PDA unit 200 has a display screen 205. The display screen 205 typically is about 3 inches diagonally across. The display screen 205 also acts as an input device where the user can touch the screen and enter data and interface to the PDA system. Additional input interfaces such as buttons 210 are also provided for in the PDA 200. The PDA unit 200 can provide for wireless communication, and include an antenna 215. The PDA unit 200 has an interface connection 220, that connects to a cradle to recharge batteries contained in the PDA unit 200. The connection 220 can provide a system interface to a device such as a keyboard.

A PDA system and a PC system can be integrated to create a computer architecture that takes advantages of the strengths of each system. To conserve battery power, the PDA system can be activated while the PC system is deactivated or placed in a suspended state. With the PDA system in control and the PC deactivated, a user continues to have the ability to communicate, check email, and perform certain computing functions. When full computing or increased data storage is needed the PC system is activated. Common peripheral devices such as a display, keyboard, and or a mouse can be shared by the two systems.

The small size and transportability appeal of the PDA is taken away when the PDA is integrated into a PC chassis. No longer is the PDA a portable unit that can be slipped into a shirt pocket. Users that value the small size of a PDA will find a need to carry a separate PDA along with a dual PC system and PDA system computing device.

A need has been felt for a mobile computing architecture having the desirable features of both the PC systems and of the PDA systems. In particular, the computing architecture would have the feature of an expanded time between battery charges. Another feature of the computing architecture would be the ability to provide for a removable PDA unit that can be separated from the mobile computing architecture.

SUMMARY OF THE INVENTION

The aforementioned and other features are accomplished, according to the present disclosure, by providing an integrated computer system including a computer system, having at least a display, a chassis, a memory, a power supply and a communication interface, and a personal digital communications (PDC) system, having at least a display, a memory, a battery and a communication interface. The computer chassis is configured to removably retain the PDC system in a docked mode, and when in said docked mode the PDC system is operable to communicate with the computer system through the respective communication interfaces and the computer system is operable to send data from the computer memory to the PDC system. The PDC system is operable to receive said data and store said data in the PDC memory and to display at least a subset of said data on the PDC display when the computer system is powered on or off.

BRIEF DESCRIPTION OF THE DRAWINGS

The present disclosure may be better understood, and it's numerous objects, features and advantages made apparent to those skilled in the art by referencing the accompanying drawings. The use of the same reference number throughout the Figures designates a like or similar element.

Figure 1:
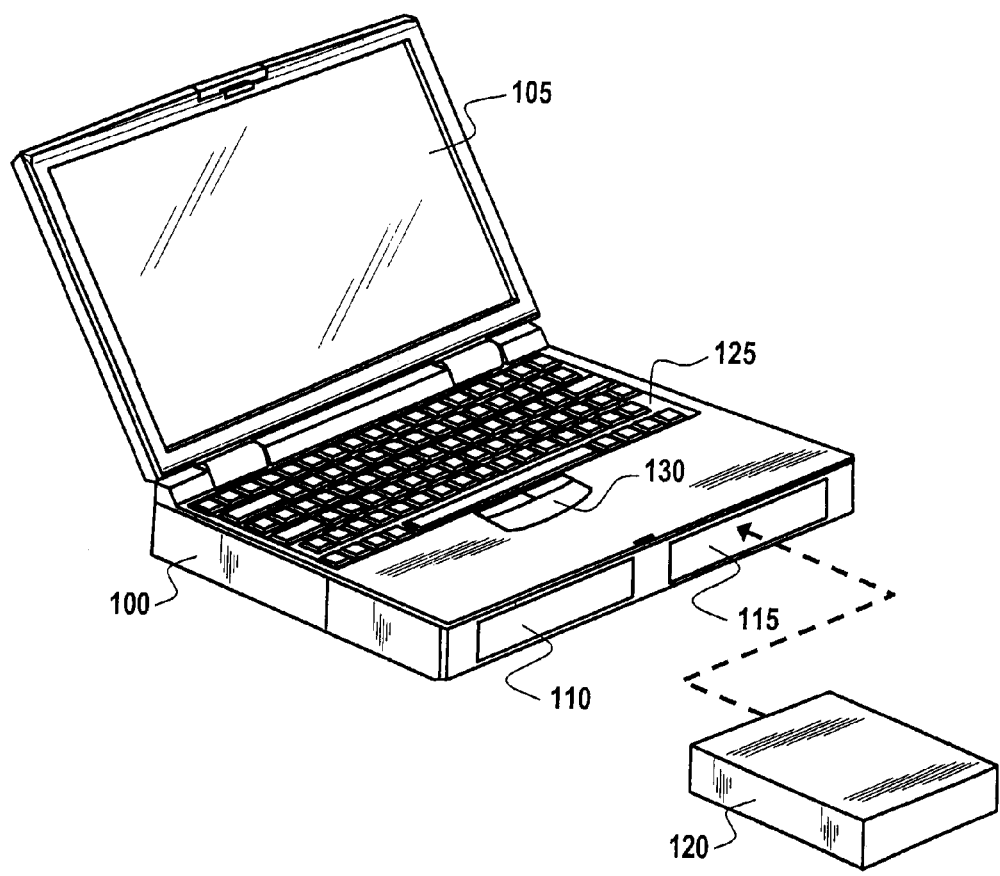
FIG. 1 illustrates a common PC unit.

While the disclosure is susceptible to various modifications and alternative forms, specific embodiments thereof are shown by way of example in the drawings and will herein be described in detail, it should be understood, however, that the drawings and detailed description thereto are not intended to limit the disclosure to the particular form disclosed but on the contrary, the intention is to cover all modifications, equivalents, and alternatives falling within the spirit and scope of the present disclosure as defined by the appended claims.

DETAILED DESCRIPTION

Figure 3:
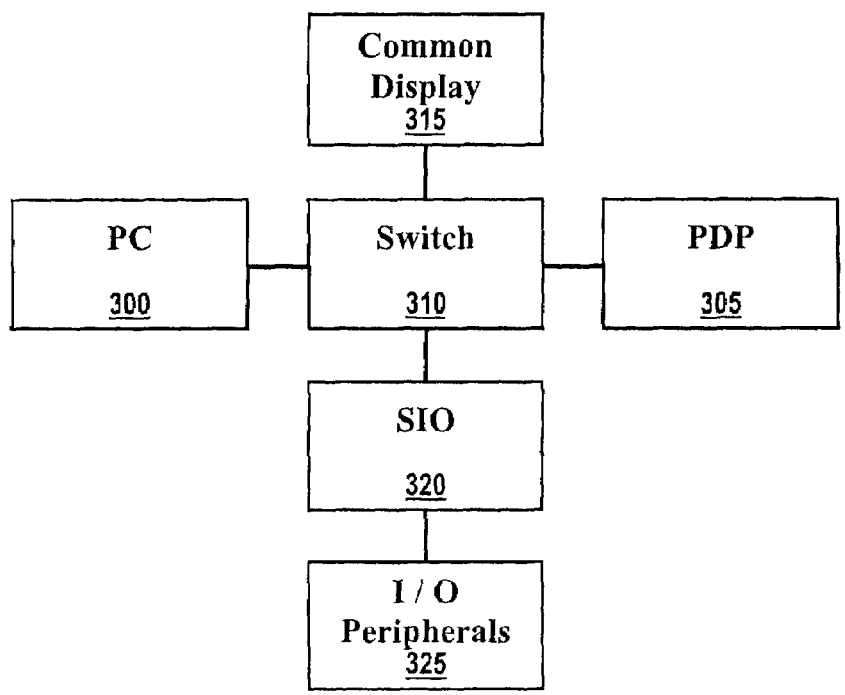
FIG. 3 illustrates a dual PC system and PDA system computer architecture.

Now referring to FIG. 3 illustrated is a dual PC system and PDA system computer architecture. A PC system 300 and a PDA system 305 are connected to a switch 310. The switch 310 isolates control to either the PC system 300 or the PDA system 305. Control may be initiated by a user or a predetermined arrangement may be made, for example initiating control to the PDA system 305 upon startup of the computer architecture. Because it takes a shorter length of time before the PDA is activated and the user is able to interface, the PC system 300 can continue to boot up while the user interfaces to the computer architecture through the PDA system 305. When either PC system 300 or PDA system 305 is in control of the computer architecture, control of a common display 315 is given. In this particular example, the computer architecture is housed in a PC chassis, and the display 315 is a full size PC display. The controlling system, either the PDA system 305 or the PC system 300, interfaces to a set of common input output (IO) or peripheral devices 325. IO or peripheral devices 325 are communicated to by the controlling system through a serial or super IO controller (SIO) 320.

Now referring to FIG. 1, the computer architecture can be housed in the PC chassis 100. The display 105 can be used as the common display 315. The keyboard 125 and touch pad 130 can be the common IO devices 325 that are interfaced to the SIO 320.

To provide for a removable PDA unit such as the PDA unit 200, that can be separated from the PC chassis, a minimum set of devices and interfaces are provided for the PDA system 305. When the PDA system 305 is physically separated from the PC chassis 100, a stand alone fully functional PDA is provided to the user.

Figure 4A:
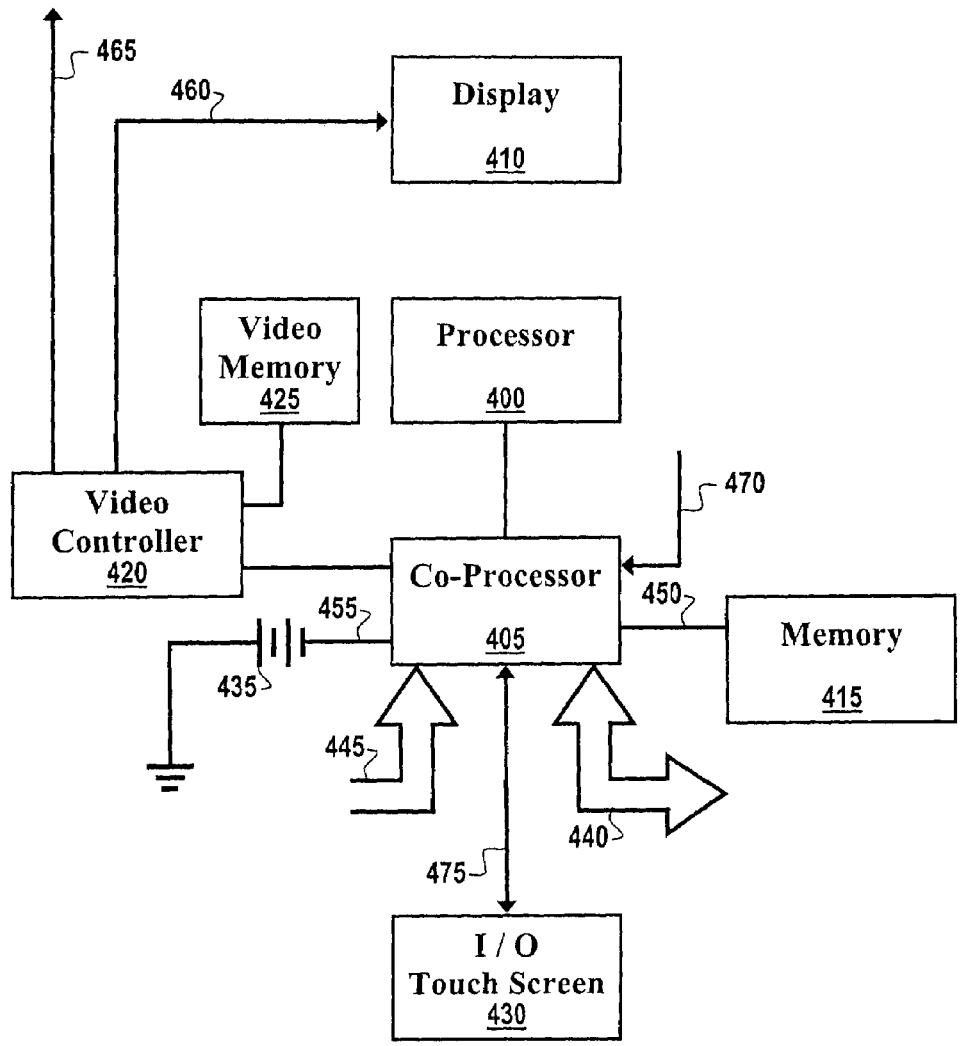
FIG. 4A illustrates a block diagram of an embodiment of a removable PDA system.

Now referring to FIG. 4A, illustrated is block diagram of an embodiment of a removable PDA system. A processor 400 performs the computing for the PDA system 305. The processor 400 is connected to a system co-processor 405. The co-processor 405 is an application specific integrated circuit (ASIC) that controls IO communications. An IO device such as a touch screen 430 interfaces to the co-processor 405 by way of IO bus 475. As commonly found in PDAs, the touch screen 430 may be part of a larger physical device that includes a display 410. The co-processor 405 interfaces to a video controller 420. The video controller 420 provides and receives data from a video memory 425. The video controller through video display bus 460 provides video data to the display 410.

The PDA system 305 has its own separate memory 415. The co-processor 405 interfaces to the PDA system memory 415 by bus 450. A stand alone PDA requires a separate power supply. A battery 435 is provided to the system, with the co-processor 405 connected to the battery 435. A direct power line 455 connects the battery 435 to the co-processor 405.

When the PDA system 305 is reconnected to the PC chassis, interface connections must be provided for from the PDA system 305 to the computer architecture. These required connections include a video bus 465 to the common display 315. The video bus 465 is connected directly to the video controller 420. When the PDA system 305 is attached to the computer architecture, the video bus 460 is turned off and video data is sent along the video bus 465. A power supply bus 470 is provided to the co-processor 405. The power supply bus 470 is a connection from the computer architecture to the PDA system 305.

When the PDA system 305 is attached to the computer architecture, IO control to the SIO 320 is needed. IO control signals from the SIO 320 to the PDA system 305 by way of the co-processor 405 are provided by unidirectional bus 445. The PDA system 305 communicates to the SIO 320 by way of a low pin count (LPC) bus 440. LPC bus 440 is a two way bus that receives and sends data to the PC architecture.

Figure 4B:
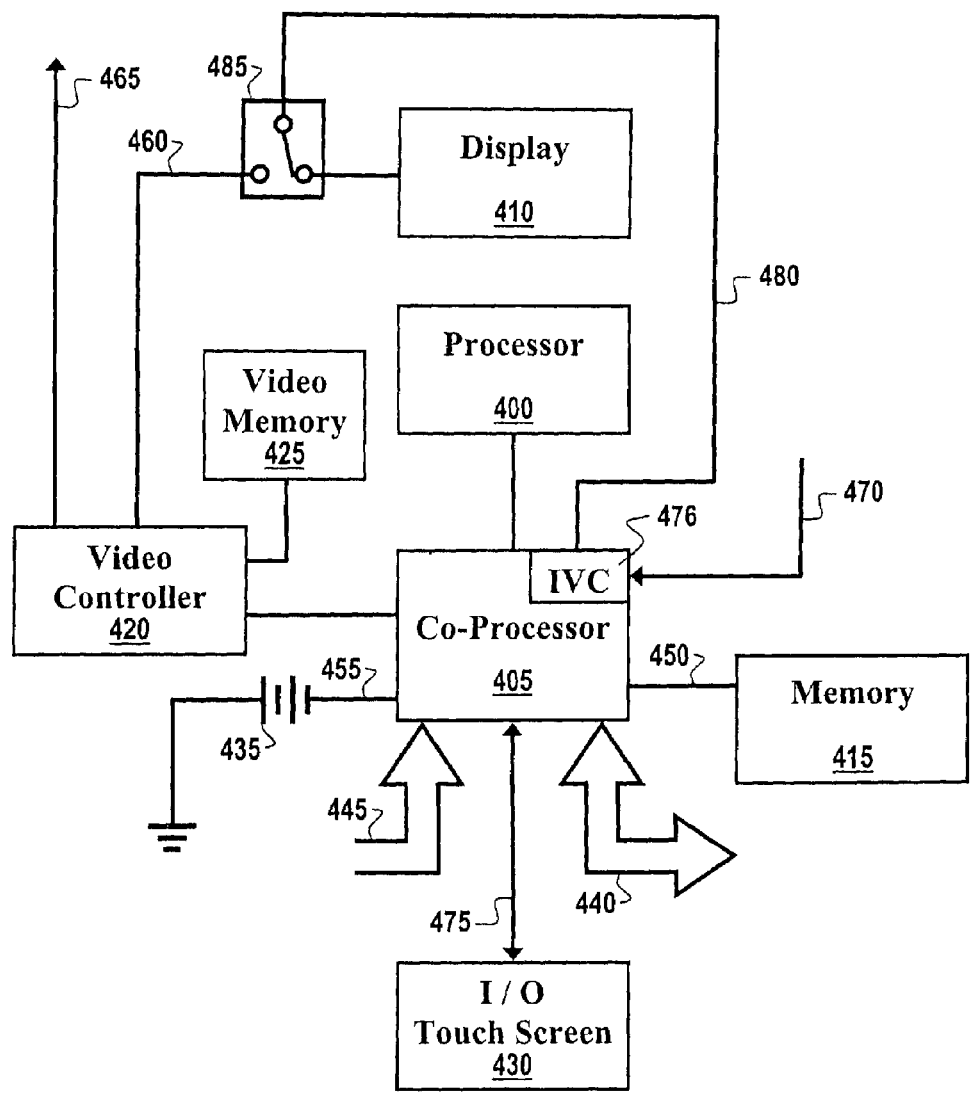
FIG. 4B illustrates a block diagram of an alternative embodiment of a removable PDA system.

Now referring to FIG. 4B, illustrated is a block diagram of an alternative embodiment of a removable PDA system. An integrated video controller 476 is designed into the co-processor 405 with video data sent along video bus 480. A general purpose input output control switch 485 passes the video signals to the display if the PDA is in independent stand alone operation.

Figure 2:
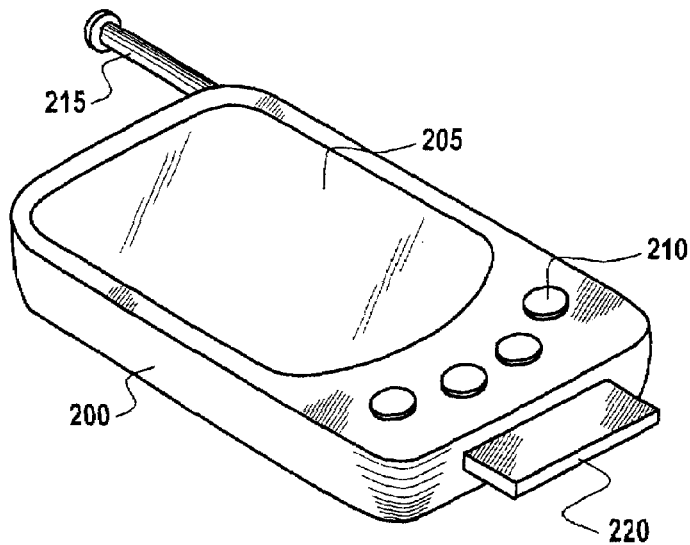
FIG. 2 illustrates a common PDA unit.
Figure 5:
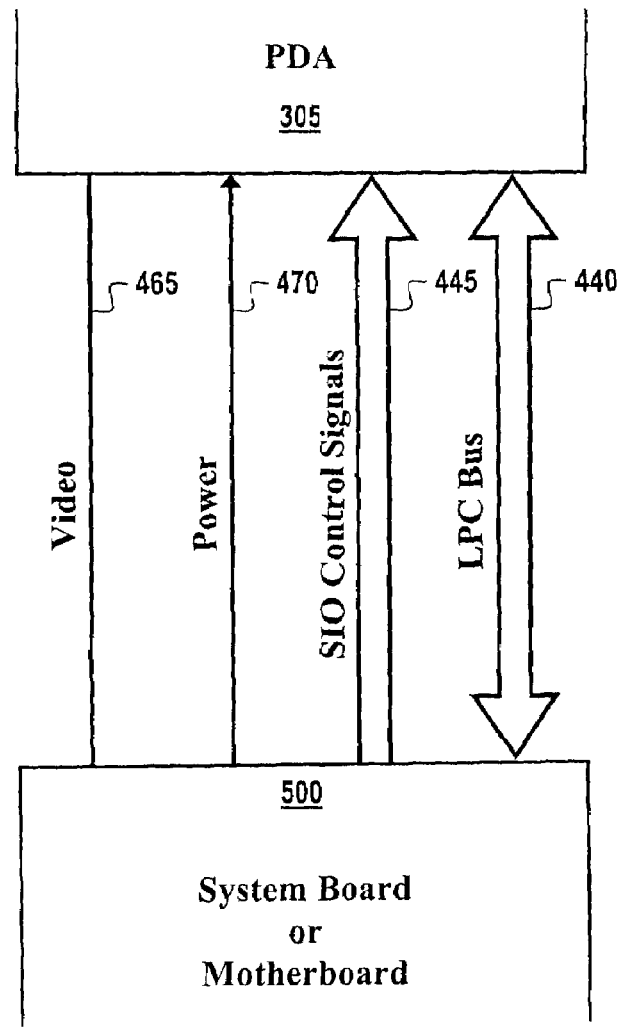
FIG. 5 illustrates signals between a removal PDA to the system board or mother board of a dual PC system and PDA system computer architecture.

Now referring to FIG. 5, illustrated are signals between a removable PDA to the system board or mother board of a dual PC system and PDA system computer architecture. A connection is provided for between a removable PDA system 305 and the system or mother board 500. Referring back to FIG. 2 the connection from the PDA system 305 can be made through a connection such as the interface connection 220. Again referring to FIG. 5, the required signal connections that must be provided include a video bus 465 that sends video data from the PDA system 305. Power from the system or mother board 500 is provided by a power supply bus 470. The SIO control signals from the system or mother board 500 are sent along bus 445. In addition the interface must provide for the LPC bus 440 connection from the PDA system 305 to the system or mother board 500.

Now referring back to FIG. 1, a removable PDA may be packaged as a form factor device 120 with connections provided as illustrated in FIG. 5. Physical mounting and signal connection interface can be provided internal to the PC chassis 100. The removable PDA can be placed in either bay 110 or bay 115, or one bay may be dedicated to receive the 5 PDA. Alternatively the receiving bay may be placed on the side or the back of the PC chassis 100.

Alternative configurations can include integrating the PDA to the bottom or side interior to or exterior of the PC chassis 100.

Figure 6:
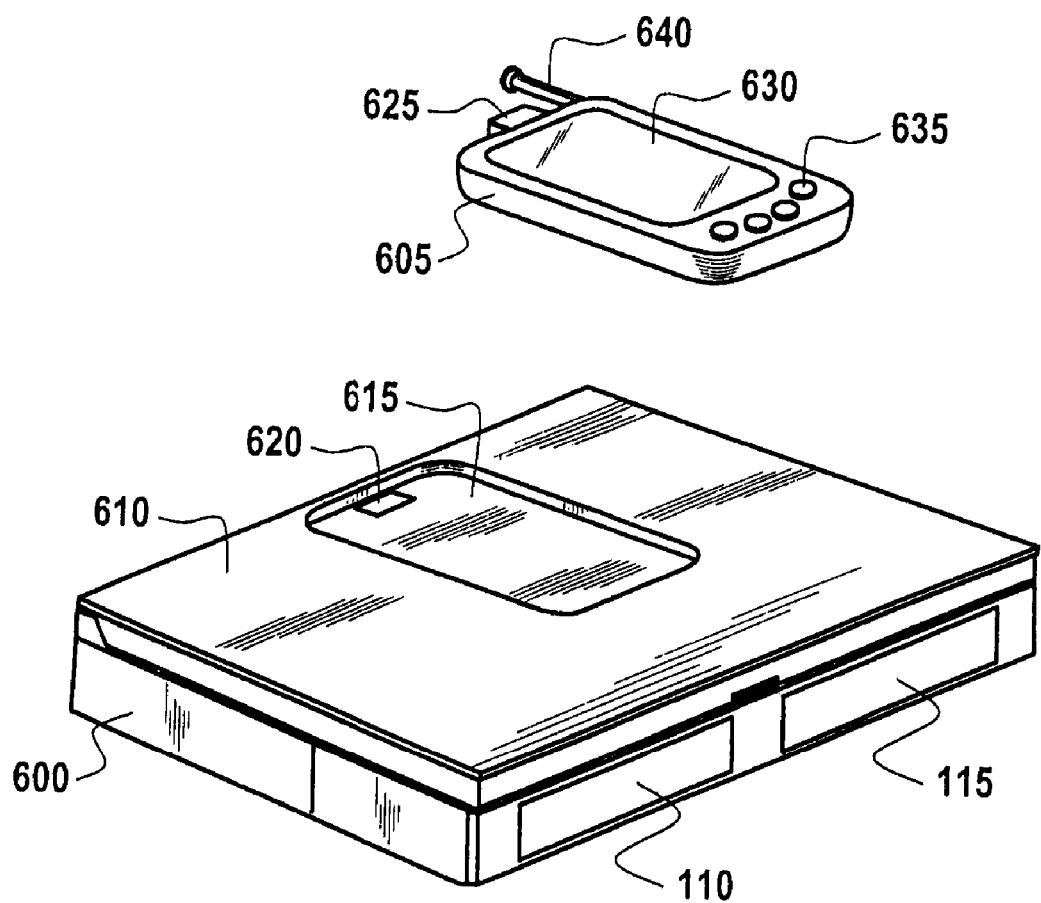
FIG. 6 illustrates an embodiment of a mounting configuration for a removal PDA on the chassis of a dual PC system and PDA system computer architecture.

Now referring to FIG. 6 illustrated is an embodiment of a mounting configuration for a removable PDA on the chassis of a dual PC system and PDA system computer architecture. A PC chassis 600 provides for an indented space 615 on the top cover 610. The indented space 615 serves a physical interface to hold a removable PDA 605. Instead of placing the PDA 606 in bay 110 or bay 115, the PDA 605 is placed into the indented space 615. A system connection is made when connector 625 of the PDA 605 connects to the connector 620 of the PC chassis 600. Other features of the PDA 605 include a display 630 where display 630 can also include a touch screen input device. The PDA 605 can have 10 buttons 635 and an antenna 640.

The embodiment illustrated in FIG. 6 provides the following method of operation. When the top cover 610 is closed, the PC system is turned off, de-activated, or suspended. Control can be passed to the PDA 605. Because the PDA 605 resides on the top cover 610, a user is able to have use of the PDA 605. Because the PDA 605 is connected to the computer architecture, the computer architecture continues to provide power to the PDA 605 using the larger capacity system battery found in the computer architecture as opposed to the lower life battery that is contained in the PDA 605. Interface to the PDA 605 is made available to the user through access to a display 630 that can include an IO touch screen, IO buttons 635. Antenna 640 may also be extended to provide wireless communications.

Although the present disclosure has been described in connection with several embodiments, the invention is not intended to be limited to the specific forms set forth herein, but on the contrary, it is intended to cover such alternatives, modifications, and equivalents as can be reasonably included with in the spirit and scope of the disclosure as defined by the appended claims.

What is claimed is:

1. A computing system comprising:
    a computer system, including at least a display, a chassis, having a closable cover, a memory, a power supply and a communication interface;
    a personal digital communications (PDC) system, including at least a display, a memory, a battery and a communication interface;
    wherein the computer chassis is configured to removably retain the PDC system in a docked mode, within an accessible indented recess in the cover when the cover is closed, wherein the power supply provides power to the PDC system when the cover is closed, and when in said docked mode the PDC system is operable to communicate with the computer system through the respective communication interfaces and the computer system is operable to send data from the computer memory to the PDC system when the PDC system is docked in the closed cover; and
    wherein the PDC system is operable to receive power and said data from the computer system and store said data in the PDC memory and to display at least a subset of said data on the PDC display when the computer system is powered on or off and the PDC system is docked in the closed cover.

2. The computing system of claim 1, wherein the communication interfaces comprise a wireless communication interface included in the PDC system.

3. The computing system of claim 2, wherein the PDC system is operable to wirelessly communicate with the computer system through the wireless communication interface when not in docked mode.

4. The computing system of claim 1, wherein the communication interfaces are wired communication interfaces.

5. The computing system of claim 1, wherein, when in docked mode, the computer power supply is configured to charge the PDC battery and provide power to the PDC system.

6. The computing system of claim 1, wherein the PDC system is operable to display at least a subset of said data on the PDC display when the computer system is powered off.

7. The computing system of claim 1, wherein the PDC system is operable to display at least a subset of said data on the PDC display when the computer system is powered on.

8. The computing system of claim 1, wherein the PDC system further comprises an antenna for wireless communications.

9. The computing system of claim 1, wherein the PDC system is a personal digital assistant system.

10. A computing system comprising:
    a computer system, including a display, a chassis, having a closable cover, a memory, a power supply and a communication interface;
    a personal digital communications (PDC) system, including a display, a memory, a battery and a communication interface; and
    wherein the computer chassis is configured to removably retain the PDC system in a docked mode, within an accessible indented recess in the cover when the cover is closed, wherein the poser supply provides power to the PDC system when the cover is closed, and when in said docked mode:
        the PDC system is operable to communicate with the computer system through the respective communication interfaces;
        the computer system is operable to send data from the computer memory to the PDC system when the PDC system is docked in the closed cover; and wherein the PDC system is operable to receive power and said data from the computer system and store said data in the PDC memory; and
        the computer power supply is configured to charge the PDC battery and provide power to the PDC system when the PDC system is docked in the closed; and
    wherein the PDC system is operable to display at least a subset of said data on the PDC display when the computer system is powered off and the PDC system is docked in the closed cover.

11. The computing system of claim 10 wherein the PDC system is operable to display at least a subset of said data on the PDC display when the computer system is powered on.

12. The computing system of claim 10, wherein the communication interfaces comprise a wireless communication interface included in the PDC system.

13. The computing system of claim 12, wherein the PDC system is operable to wirelessly communicate with the computer system through the wireless communication interface when not in docked mode.

14. The computing system of claim 10, wherein the communication interfaces are wired communication interfaces.

15. The computing system of claim 10, wherein the PDC system further comprises an antenna for wireless communications.

16. The computing system of claim 10, wherein the PDC system is a personal digital assistant system.

* * * * *

UNITED STATES PATENT AND TRADEMARK OFFICE
CERTIFICATE OF CORRECTION

| | | |
|---|---|---|
| PATENT NO. | : 7,526,586 B2 | Page 1 of 1 |
| APPLICATION NO. | : 11/691060 | |
| DATED | : April 28, 2009 | |
| INVENTOR(S) | : Gary Douglas Huber et al. | |

It is certified that error appears in the above-identified patent and that said Letters Patent is hereby corrected as shown below:

Claim 10, Column 6, Line 26, delete "poser" and insert --power--.

Signed and Sealed this

Fifth Day of January, 2010

David J. Kappos
*Director of the United States Patent and Trademark Office*